(12) United States Patent
Fiorello et al.

(10) Patent No.: US 10,239,548 B2
(45) Date of Patent: Mar. 26, 2019

(54) MULTIPLE BAG HANGING CART

(71) Applicants: Albert Fiorello, Greenwood Village, CO (US); Luke Fiorello, Greenwood Village, CO (US)

(72) Inventors: Albert Fiorello, Greenwood Village, CO (US); Luke Fiorello, Greenwood Village, CO (US)

( * ) Notice: Subject to any disclaimer, the term of this patent is extended or adjusted under 35 U.S.C. 154(b) by 0 days.

(21) Appl. No.: 15/953,719

(22) Filed: Apr. 16, 2018

(65) Prior Publication Data
US 2018/0304913 A1    Oct. 25, 2018

Related U.S. Application Data

(60) Provisional application No. 62/487,337, filed on Apr. 19, 2017, provisional application No. 62/558,635, filed on Sep. 14, 2017.

(51) Int. Cl.
 *B62B 3/14* (2006.01)

(52) U.S. Cl.
 CPC ............ *B62B 3/1472* (2013.01); *B62B 3/144* (2013.01); *B62B 3/146* (2013.01); *B62B 2203/02* (2013.01); *B62B 2205/30* (2013.01)

(58) Field of Classification Search
 CPC ......... B62B 3/1464; B62B 1/14; B62B 1/042; B62B 3/144; B62B 3/146
 See application file for complete search history.

(56) References Cited

U.S. PATENT DOCUMENTS

| | | | |
|---|---|---|---|
| 4,576,388 A * | 3/1986 | Pope | B62B 3/1464 248/100 |
| 4,974,799 A | 12/1990 | Palmer | |
| 7,258,352 B2 * | 8/2007 | Odgers | B62B 1/042 280/47.2 |
| D608,518 S * | 1/2010 | Luebke | D34/21 |
| 7,887,068 B2 * | 2/2011 | Ferguson | B62B 1/14 280/33.992 |
| 9,462,876 B2 | 10/2016 | Drori | |
| 9,566,994 B1 | 2/2017 | Leslie | |
| 2004/0124598 A1 | 7/2004 | Williams | |
| 2006/0097467 A1 | 5/2006 | Solomon | |
| 2008/0088101 A1 | 4/2008 | Ferguson | |
| 2009/0224495 A1 | 9/2009 | Anderson | |
| 2010/0320246 A1 | 12/2010 | Taylor | |
| 2012/0169020 A1 | 7/2012 | Farrell | |

(Continued)

FOREIGN PATENT DOCUMENTS

| | | |
|---|---|---|
| WO | 2012004528 | 1/2012 |
| WO | 2012004529 | 1/2012 |

(Continued)

*Primary Examiner* — Hau V Phan
(74) *Attorney, Agent, or Firm* — Leyendecker & Lemire, LLC

(57) ABSTRACT

A multiple bag hanging cart is described. Embodiments of the multiple bag hanging cart can include a longitudinal divider having a plurality of dual prong hooks and a plurality of single prong hooks spaced along right and left sides of the cart. The dual prong hooks of the longitudinal divider can be configured to be aligned with respective single prong hooks located on either side of the cart. In use, one or more bags can be hung within a basket of the cart via the dual prong hooks and the single prong hooks to allow for easy insertion of items into the bags.

19 Claims, 7 Drawing Sheets

(56) References Cited

U.S. PATENT DOCUMENTS

2015/0246751 A1  9/2015 Spivack
2016/0297461 A1  10/2016 Barr-Perea
2016/0311454 A1* 10/2016 Hendrick .............. B62B 3/1464

FOREIGN PATENT DOCUMENTS

| WO | 2012072912 | 6/2012 |
| WO | 2013093384 | 6/2013 |
| WO | 2016191759 | 12/2016 |

* cited by examiner

MULTIPLE BAG HANGING CART

CROSS-REFERENCE TO RELATED APPLICATION

This application claims the benefit of U.S. Provisional Application No. 62/487,337, filed Apr. 19, 2017 and U.S. Provisional Application No. 62/558,635, filed Sep. 14, 2017.

BACKGROUND

Currently available shopping carts, most notably those found in grocery stores and like, typically require a user to put items in the basket as they shop and then have those items bagged as they check out and pay for said items. Since most stores having checkout lines still require the items to be mostly removed from the cart, having items bagged before checking out does not provide any benefit to the shopper or the store. However, with the advent of RFID check-out systems, users may soon be able to bag their items while shopping and not be required to remove said items when checking out.

Therefore, there is a need for a shopping cart that can provide a means for hanging multiple bags in an open configuration in a shopping cart to allow a user to easily insert items into the bags as they shop. Due to the high costs of introducing a completely new shopping cart, a kit configured to retrofit currently available shopping carts that provides a means for easily hanging multiple bags is also needed.

DETAILED DESCRIPTION

Figure 1:
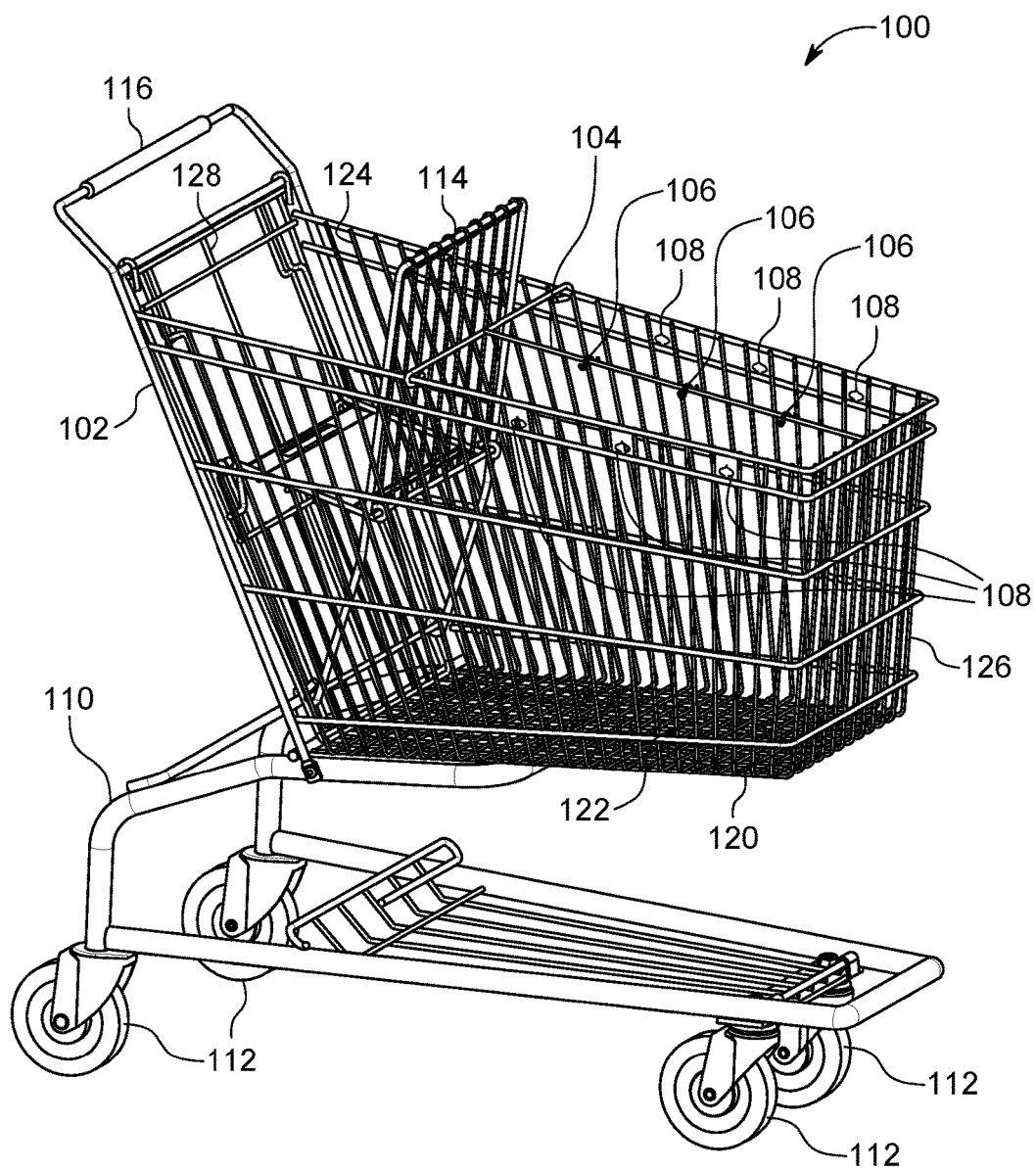
FIG. 1 is a perspective view of a multiple bag hanging cart according to one embodiment of the present invention.

Embodiments of the present invention include a shopping cart configured to secure two or more shopping bags in an open configuration to an interior of a basket of the shopping cart. One embodiment of the shopping cart can include, but is not limited to, a common shopping cart, a longitudinally extending divider, a plurality of dual prong hooks coupled to the longitudinally extending divider, and a plurality of single prong hooks located on each side of the shopping cart. As can be appreciated, the single prong hooks located on the sides of the shopping cart can be aligned to coincide with the dual prong hooks located on the longitudinally extending divider. In operation, a shopping bag can be attached to a hook on the longitudinally extending divider and a corresponding hook located on a side of the cart. Typically, 1-6 bags can be held by the shopping cart to allow for easy placement of items into the shopping bags while shopping.

The longitudinally extending divider, when integrated into a shopping cart, can extend down a center of the cart and can include a plurality of hooks disposed thereon. Typically, the hooks can be equidistantly spaced along a length of the longitudinally extending divider. In some embodiments, the hooks can be intermittently spaced. Typically, left and right sides of the cart can be configured with hooks spaced equidistantly (or intermittently) along respective lengths of the sides depending on a configuration of the hooks on the divider.

Operationally, standard plastic grocery bags and/or reusable shopping bags can be suspended from at least two hooks placing the bag in an open configuration and permitting easy access thereto. For instance, handles of the plastic bag can interface with a hook from a side of the cart and a hook on the divider. Of note, the longitudinal divider and the associated hooks positioned along the length of the side of the cart can be configured to not interfere with, or prevent, the nesting of the shopping cart with another shopping cart. The various embodiments described herein do not typically interfere with the regular operation and use of a child seat integrated into a typical shopping cart.

In another embodiment, the divider can be detachably coupled to the shopping cart such that the divider can be removed and stored when nesting with another shopping cart. In such an embodiment, the dual prong hooks can be coupled to the divider so that they do not move.

Various different means are contemplated to couple the plurality of single prong hooks to the sides of the cart. In one example, each of the single prong hooks can include an attachment mechanism for coupling the single prong hook to the side of the cart. In another example, the plurality of single prong hooks can be rotatably coupled to the side of the cart such that when not in use, the hooks can be rotated to be in-line with the side of the cart.

The divider can typically attach to, or proximate, a top perimeter of an associated cart usually, but not necessarily, in front of a child seat support. The divider can comprise a rigid rod or a flexible cable made of a suitable material, such as steel. Variations comprised of reinforced or unreinforced plastic are also contemplated. The positioning of the divider can permit the cart to be nested wherein the back side of the cart is pivoted upwardly when receiving another cart therein from behind.

In one embodiment, the divider can be a substantially "T" shaped center divider that can connect to the cart at three locations. A lateral top member of the "T" can comprise a rigid or semi-rigid rod that may be clamped, welded, hooked or otherwise secured to the cart just forward of the child seat support when the child seat support is extended. Proximate the center of the top member, a longitudinal member of the "T" can comprise a rigid or semi-rigid rod that extends forwardly bisecting a top of the cart longitudinally. The longitudinal member can be secured to the proximate middle of a front side of the cart by way of a clamp, welding, a hook, or any suitable means. As can be appreciated, the longitudinal member and lateral member of the divider can be comprised of cables, which may be held sufficiently taut by the connections to the side of the cart.

A plurality of hooks can be spaced along the sides of the cart and along the longitudinal member from which grocery bags can be suspended. The number of hooks, a specific configuration of the hooks, and a means of attachment of the hooks to the sides of the cart and the longitudinal member can vary but are configured as to not interfere with the nesting operation of the cart.

In one embodiment, hooks located on sides of the cart can be attached to the side of the chart proximate a top edge of the side of the cart by way of a hinged coupling. The hinged coupling can be biased in a deployed position, but also can be configured to swing (or rotate) forwardly when another cart is nested into the cart to which the hinged coupling is attached. This style of hook can be attached to the cart by any suitable means including, but not limited to, clamping and welding.

In other variations, the hooks can be integrally formed into the side of the cart. U.S. Pat. No. 7,887,068, which is herein incorporated by reference, teaches a shopping cart having integrally formed hooks disposed and spaced along the left and right sides of the cart.

In yet other variations, the side hooks can be configured to slide longitudinally along the top side of the respective left and right sides so that the hooks can, as necessary, be aligned with hooks located on the longitudinal divider.

In one embodiment, a hook to be implemented with the longitudinal divider can comprise a split hook with one hook extending outwardly from the left side of the longitudinal divider and another hook extending outwardly from the right side of the longitudinal divider. The hook can be pivotally attached to the longitudinal member. In variations, low profile single or split hooks can be used that are immovably attached to the cable or rod and do not require pivoting to permit the nesting of another cart. Hooks that slide along the divider (and the sides of the cart as well) are also contemplated.

In another embodiment, the divider can comprise an at least partially flexible cable extending longitudinally from the child seat support to the front end of the cart. At either end, the cable can be attached to the cart by any suitable means, such as clamping or attachment to brackets clamped, welded, or otherwise attached to the cart. A plurality of hooks, typically split hooks, can be spaced along the divider cable. The cable can be somewhat lax when the child seat is extended. When the child seat is retracted, the cable can be taut. A flexibility of the cable can permit the cart to be nested with other carts without undue interference from the divider. As with previously described embodiments, suitable hooks can be provided along the left and right side of the cart.

In one embodiment, the divider can comprise a cable. In this embodiment, the cable can be attached to front and pivoting rear sides of the cart by any suitable means. As can be appreciated, the cable can hang lower than in the previously described embodiments as the cable can be routed underneath the child seat as to not interfere with the use of the child seat. As with the other embodiments, suitable hooks can be provided along the divider cable as well as along the left and right sides of the cart.

In one embodiment, a divider can include both a longitudinal cable and a transversely (or laterally) extending cable or bar. Ends of the laterally extending cable or bar can be attached to the child seat support at left and right edges thereof. A length of the lateral cable can be greater than the distance between attached ends and therefore the cable has a substantially "U" or "V" shape. The longitudinal cable, which can include hooks spaced thereon, can be secured to a center of the lateral cable and to a center of the front side of the cart. When the child seat is deployed, the cable hangs a bit lower than when the child seat is retracted but remains functional in both configurations. In one variation, a "U" shaped bar can be implemented for the lateral member. The bar can be pivotally attached at ends of the bar to the child seat support permitting the bar to rotate depending on whether the child seat is deployed or retracted.

In one embodiment, a plurality of bars or cables extending laterally across a shopping cart from a left side to a right side can be implemented. Each bar or cable can be secured to the top edges of the sides in any reasonable manner. In one variation, for instance, the bars simply hook over the top edges of the sides. The bars include hooks spaced thereon.

In one embodiment, the divider can be a cable (or line) that can be retractable. The cable can be retracted to a housing including a retractor mechanism. The cable can comprise any suitable material including, but not limited, a synthetic polymer line, braided or wound wire, and/or a braided or wound textile filament. Hooks can be slidably attached to the cable. When the cable is retracted, the hooks can gather at an end of a housing of the retractor mechanism.

The retractor mechanism can typically be mounted on a backside of a child seat. In some embodiments, the retractor mechanism can be mounted in other locations, such as the end of the cart in an opposite configuration with the mechanism be located in the front of the cart. The mechanism can typically comprise a spool in operative communication with a spring that automatically retracts the cable when the spring is released. The spring and spool can be contained in a housing and the housing can be mounted to the cart by any suitable means. In some variations, a lock feature can be provided to secure the cable in the retracted position or, perhaps more importantly, the deployed position until released.

At the end of the cart, a means to fix the cable in the deployed position can be provided. In one embodiment, a keyhole slot can be provided in which the appropriately configured end of the cable can be received. In other variations, the end of the cable may simply comprise a hook that can be received over the edge of an end of the cart. When the cable is deployed, the various hooks for receiving the grocery bags can be slid along the cable and distributed there along. In one embodiment, the cable can be configured with notches, indentations, or other means to denote where the hooks should be approximately placed. For instance, the cable could include colored markers to indicate where the hooks should be placed. Hooks can also be provided along the left and right edges of the cart. These hooks can be of any suitable configuration including those described previously.

In one embodiment, the retractable cable can include a slotted tab at a front end of the cable adapted to slip into a slotted holder attached to the front of the cart. In another embodiment, the retractable cable can include a hook at an end of the cable to allow the cable to be easily coupled and uncoupled to the front of the cart. Of note, the hook would be compatible with both wire carts and plastic carts. Further, a user would be able to move the line vertically (up and down) on the front of the cart.

Operationally, a user can pull a nested grocery cart from another cart to free the desired cart. Next, assuming the cable is retracted, the user can pull the cable from the retractor mechanism and secure the end of the cable at the opposite end of the cart. The hooks can then be distributed along the cable so that they generally align with the hooks on the sides of the cart. In one instance, the user can use the markers on the cable to determine where to place the hooks. Bag can be hung from the hooks and groceries can be placed in the open bags as the user shops. After checking out, the user can remove the bags. Optionally, after the bags are removed from the cart, the end of the cable can be released and permitted to retract back into the retractor mechanism. The hooks will typically slide along the cable as the cable is retracted and gather at the housing. Of important note, carts including variations of the retractable cable can typically be nested without the removal of the cable from the deployed position. Retraction of the cable may only be necessary when a user desires to use the cart to carry larger items where the cable would interfere.

Embodiments can further include a kit configured to modify (or retrofit) an existing shopping cart with components similar to the previously described shopping cart. Typically, the kit can include, but is not limited to, a longitudinally extending divider, a plurality of dual prong hooks, and a plurality of single prong hooks. In some embodiments, the divider can be retractable such that the divider can be effectively removed when nesting with another cart. For instance, the divider can include a retractable cable with the dual prong hooks moveably coupled to the cable. As can be appreciated, as the cable is retracted, the dual prong hooks can slide along the cable and bunch up near where the cable retracts to.

In one embodiment, the kit can include a longitudinal divider and associated structure for mounting the divider to an existing nesting cart. The kit can further include hook assemblies for attachment to the left and right sides of the cart. In one instance, the divider can comprise a cable with hooks spaced there along. In another instance, the divider can comprise a bar with hooks spaced there along. The kit can further include a structure to facilitate welding the components to the existing cart. In another instance, the kit can include a structure to facilitate mechanically fastening the components to the existing cart. In yet another instance, the kit can include a structure to facilitate adhesively bonding the components to the existing cart. The side hooks can include hinges to permit the hooks to retract to sit substantially flush against the sides of the cart when the cart is nested with other carts.

In a typical implementation, grocery bags can be suspended by their handles between a divider hook and a hook along the left or right side of the cart. As suspended, the bags can be open permitting a shopper to easily deposit goods they intend to purchase in the bags. For added support, the bottoms of the bags typically rest on a bottom or a floor of the basket of the cart.

In stores utilizing RFID technology, the contents of the bags can be sensed and determined when RFID tags on each product are sensed and their electronically stored content is read by a RFID tag-reader. The electronic reader can be located in each cart and configured to read the tags of items placed in the cart (or bags resident in the cart). Alternatively, the cart can be rolled into a check out area wherein a reader scans the tags of products resident in the cart. In either case, check out can be completed without removing the products being purchased from the cart or the bags. When shopping is complete the user need only remove the bags from the hooks and the cart to take their purchases.

In one embodiment, one or more reusable bags having built in hooks on straps of the bags can be implemented. In such an embodiment, one of the handles having a hook can attach to the side of the cart and the other handle and hook can be coupled to the hooks of the longitudinal divider.

The foregoing embodiments and variations are for illustrative purposes only and additional variations and embodiments as would be obvious to one of ordinary skill in the art given the benefit of this disclosure are contemplated. For instance, cables and rods as appropriate can be substituted for one another. Other structures, such as beams made of plastic can be substituted for the cable and rod structures as appropriate. Various means of coupling and attaching the various components together and to the cart are contemplated. Embodiments that retract or fold against the bottom of a cart to permit nesting are contemplated. Other embodiments that fold flat or collapse against the front side of the cart and can be pulled rearward and secured in place for use are also contemplated.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

A First Embodiment of a Multiple Bag Hanging Cart

Referring to FIG. 1, a detailed diagram of an embodiment 100 of a multiple bag hanging cart is illustrated. The multiple bag hanging cart 100 can be implemented to hang a plurality of bags in an open position inside a basket of the cart 100.

The cart 100 can typically include, but is not limited to, a basket 102, a longitudinal divider 104, a first plurality of hooks 106, and a second plurality of hooks 108. The cart 100 may further include a lower frame 110 having a plurality of casters (or wheels) 112, a child seat 114, and a handle 116.

The basket 102 can be defined by a bottom 120, a right sidewall 122, a left sidewall 124, a front wall 126, and a back wall 128. Depending on an implementation, the basket 102 can be made from metal or rigid plastic. Similar to currently available carts, the back wall 128 can have a hinged connection such that the back wall 128 can rotate upwards towards an interior of the basket 102 to allow another cart to nest with cart 100. For instance, the basket 102 can receive another basket inside the basket 102 via the back wall 128. The child seat 114 can typically be integrated into the back wall 128.

The longitudinal divider 104 can extend from proximate the child seat 114 to proximate the front wall 126 effectively dividing the basket 102 in-half along a longitudinal line of the basket 102. As shown, the longitudinal divider 104 can be substantially "T" shaped and can connect to the cart at three locations. The longitudinal divider 104 can be defined by a lateral top member and a longitudinal member. The lateral top member of the "T" can comprise a rigid or semi-rigid rod that may be clamped, welded, hooked or otherwise secured to the cart just forward of the child seat support when the child seat support is extended. Proximate the center of the top member, the longitudinal member of the "T" can comprise a rigid or semi-rigid rod that extends forwardly bisecting a top of the cart longitudinally. The longitudinal member can be secured to the proximate middle of a front side of the cart by way of a clamp, welding, a hook, or any suitable means. As can be appreciated, the longitudinal member and lateral member of the divider 104 can be comprised of cables, which may be held sufficiently taut by the connections to the side of the cart 100.

The first plurality of hooks 106 can be dispersed along a length of the divider 104. Typically, the hooks 106 can be evenly spaced along a length of the divider 104. In one embodiment, the hooks 106 can each be dual prong hooks with the prongs of the hooks facing either side of the basket 102. Of note, different shaped dual prong hooks are contemplated. In some embodiments, a pair of single prong hooks can be used in conjunction to one another to face the sides of the basket 102.

The second plurality of hooks 108 can be dispersed along an upper edge of the right sidewall 122 and the left sidewall 124. As shown, the hooks 108 can be integrated into the sidewalls 122, 124 and sit flush within the side walls to allow another cart to be nested within the basket 102.

In a typical implementation, one or more grocery bags can be hung between the longitudinal divider 104 and either of the sidewalls 122, 124 of the basket 102. Items can then be placed in each of the bags as a user shops.

Of note, other configurations of the longitudinal divider 104 are contemplated as described previously.

An Embodiment of a Multiple Bag Hanging Cart Kit

Figure 2:
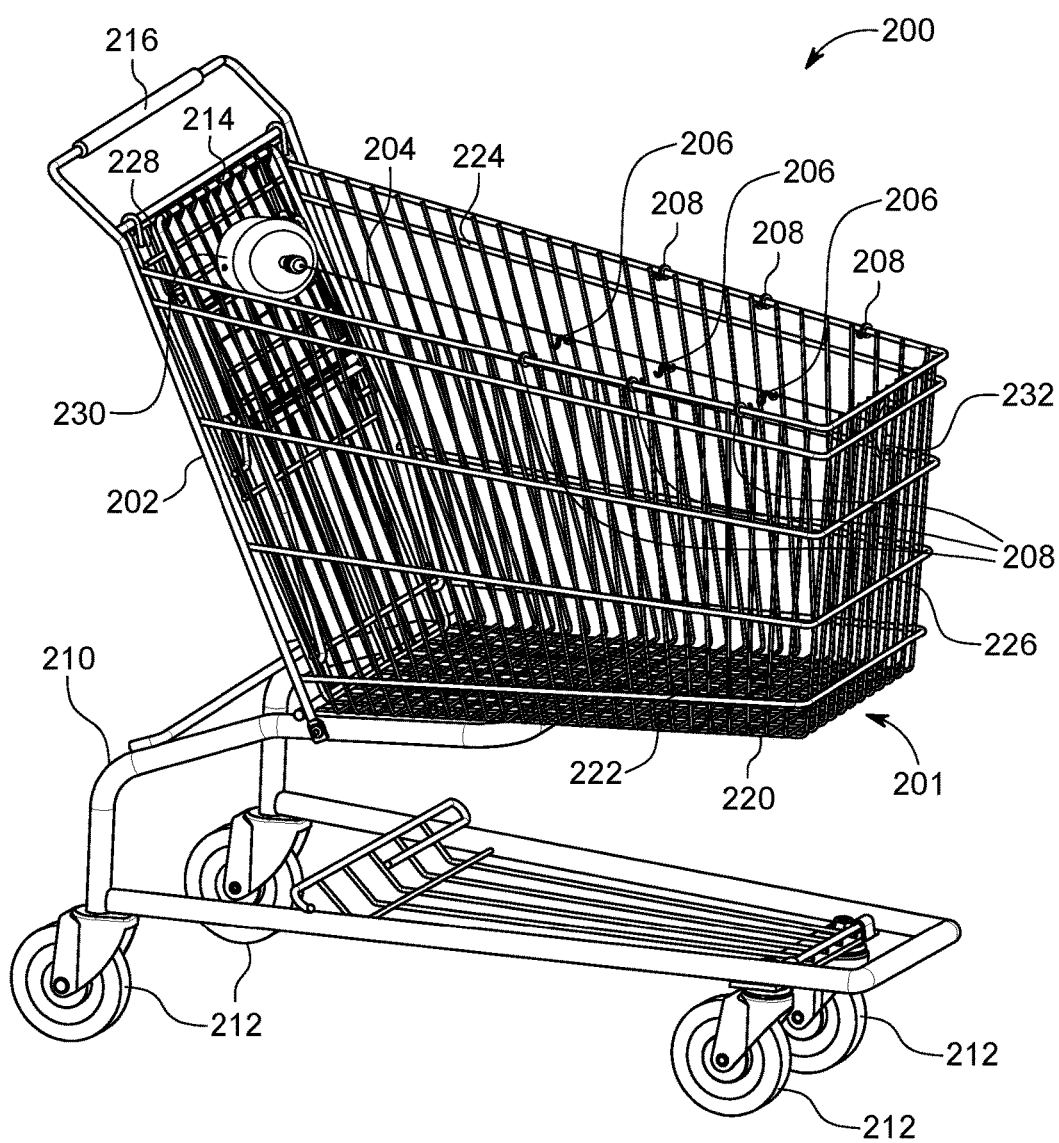
FIG. 2 is a perspective view of a multiple bag hanging cart kit according to one embodiment of the present invention.

Referring to FIG. 2, a detailed diagram of an embodiment 200 of a multiple bag hanging cart kit is illustrated. Typically, the kit 200 can be implemented to modify (or retrofit) an existing shopping cart to be able to store one or more shopping bags in an open configuration inside a basket of the shopping cart.

As shown, the kit 200 can typically include, but is not limited to, a longitudinal divider 204, a first plurality of hooks 206, a second plurality of hooks 208, a retractor mechanism 230, and an attachment mechanism 232.

Typically, the previously mentioned components can be coupled to an existing shopping cart 201. The existing cart 201 can include a basket 202, a lower frame 210 having a plurality of casters 212, a child seat 214, a handle 216. The basket 202 can be defined by a bottom 220, a right sidewall 222, a left sidewall 224, a front wall 226, and a back wall 228. Of note, the child seat 214 can be integrated with the back wall 228.

In one embodiment, the longitudinal divider 204 can be a cable (or line) that can be configured to be retractable. The cable 204 can be retracted via the retractor mechanism 230. The cable 204 can comprise any suitable material including, but not limited to, a synthetic polymer line, braided or wound wire, and/or a braided or wound textile filament. The first plurality of hooks 206 can be slidably coupled to the cable 204.

Figure 3:
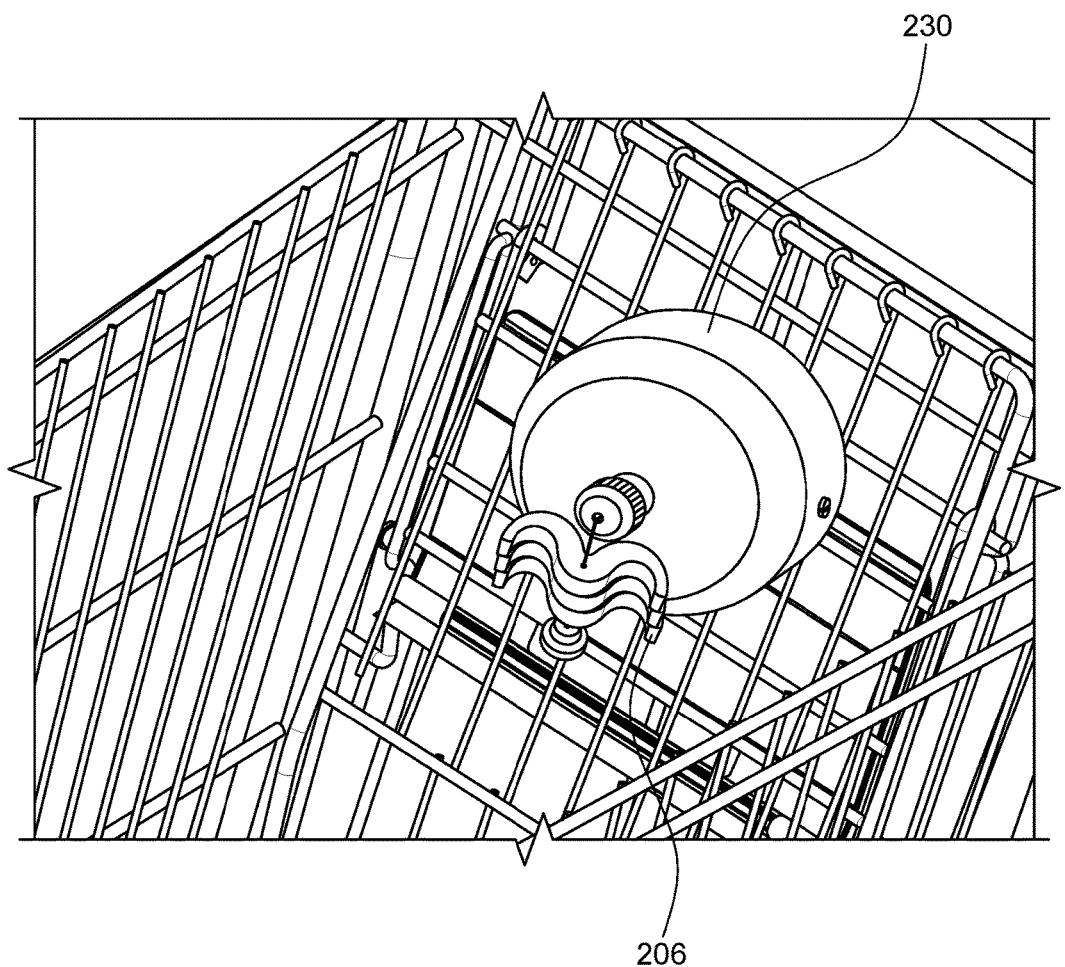
FIG. 3 is a close-up view of a retractor mechanism according to one embodiment of the present invention.

As shown in FIG. 3, when the cable 204 is retracted, the hooks 206 can gather at an end of the retractor mechanism 230. In such a configuration, the child seat 214 and the back wall 228 can be rotated upwards to receive a cart therein to nest.

Referring back to FIG. 2, the longitudinal divider 204 can be effectively coupled to the front wall 226 and proximate the back wall 228 (e.g., via the child seat 214). As shown, the retractor mechanism 230 can be coupled to the child seat 214 and the attachment mechanism 232 can be coupled to the front wall 226 of the basket 202. Although shown with the retractor mechanism 230 and the attachment mechanism 232 coupled to the child seat 214 and the front wall 226 respectively, the components can be switched with the retractor mechanism 230 coupled to the front wall 226 and the attachment mechanism 232 coupled to the child seat 214 (or back wall 228).

The retractor mechanism 230 can typically comprise a spool in operative communication with a spring that automatically retracts the longitudinal divider 204 when the spring is released. The spring and spool can be contained in a housing and the housing can be mounted to the cart 201 by any suitable means. In some variations, a lock feature can be provided to secure the longitudinal divider 204 in the retracted position or, perhaps more importantly, in the deployed position until released.

Figure 4A:
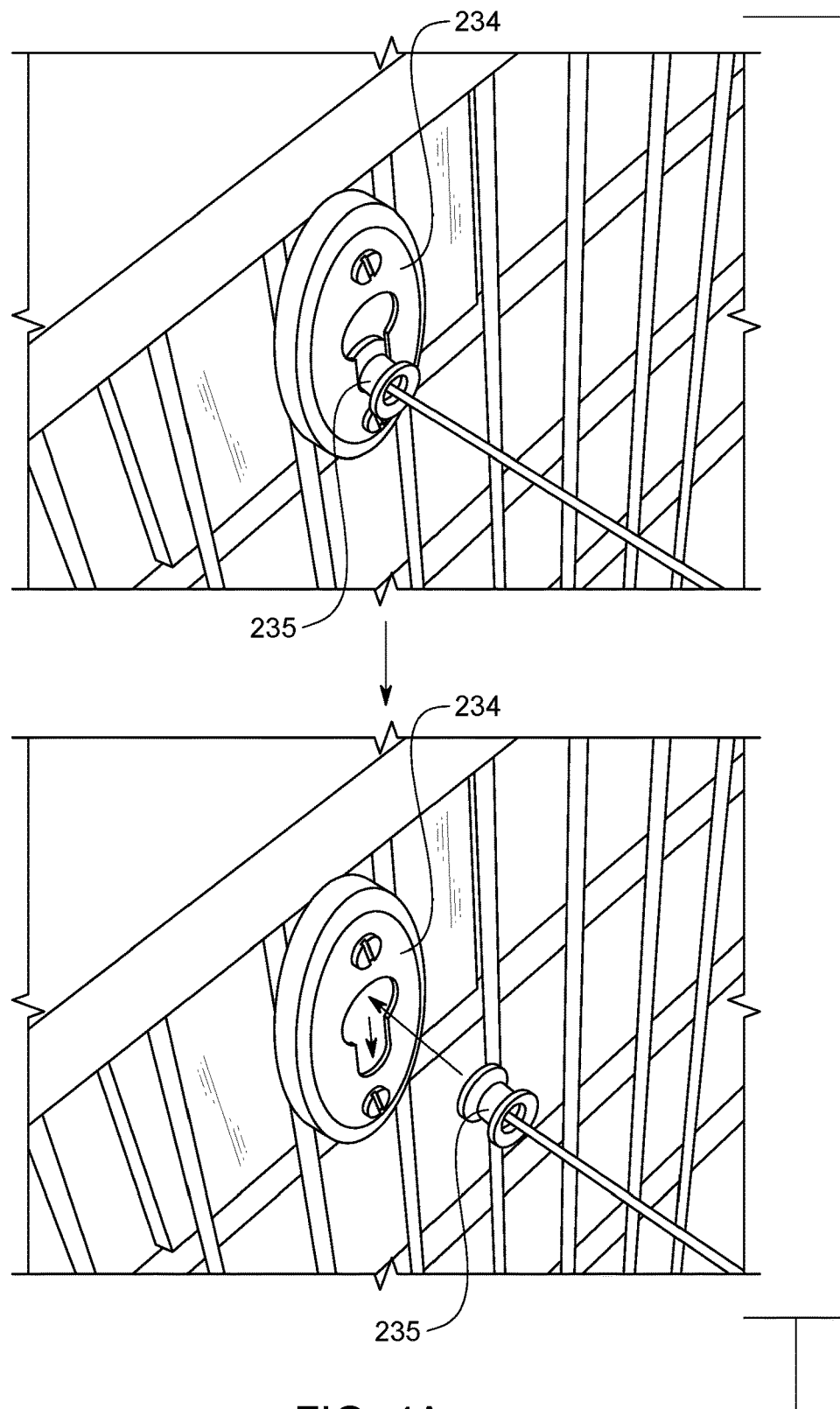
FIG. 4A is a close-up view of an attachment mechanism according to one embodiment of the present invention.
Figure 4B:
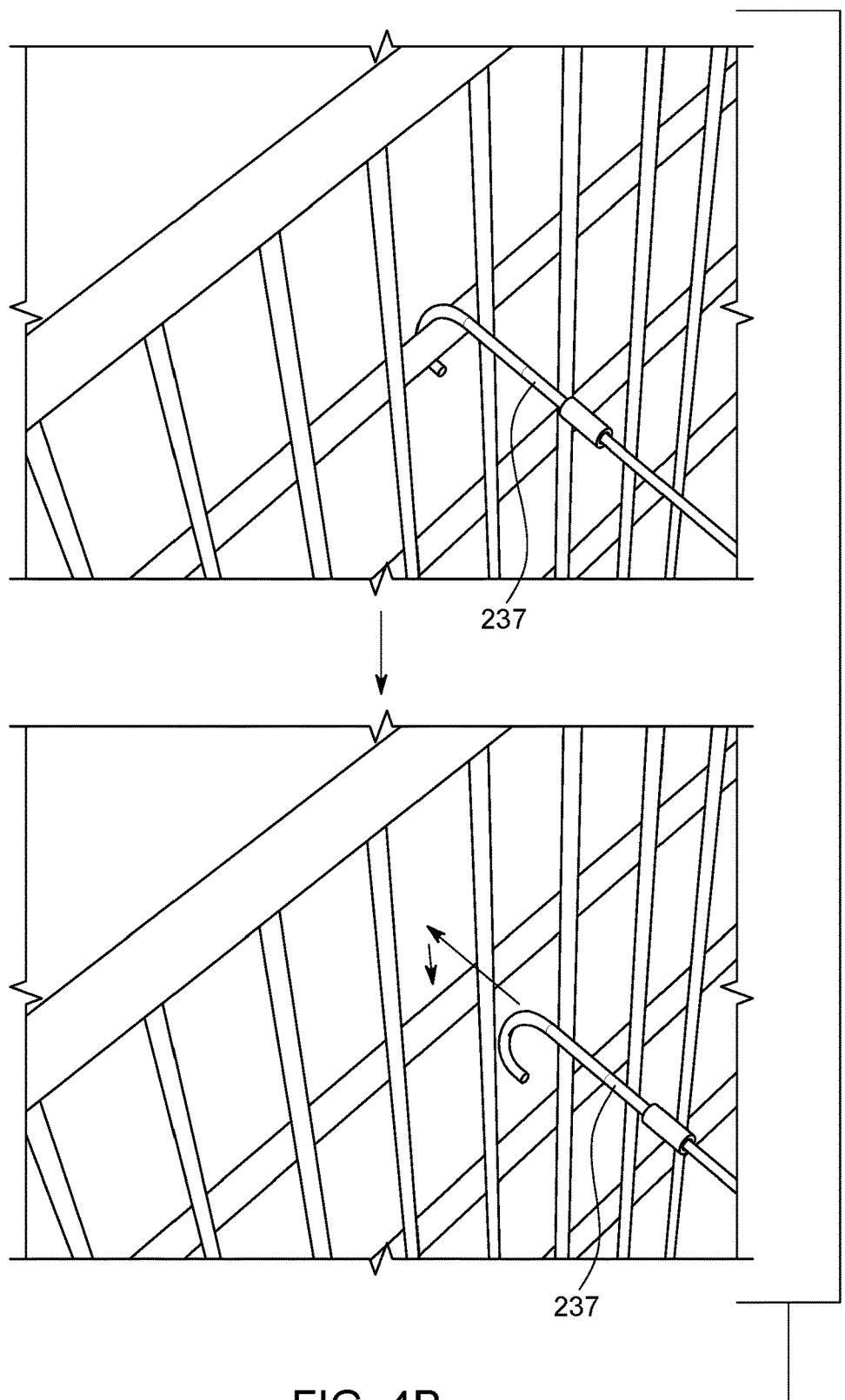
FIG. 4B is a close-up view of another attachment mechanism according to one embodiment of the present invention.

At the end of the cart 201, the attachment mechanism 232 can couple the longitudinal divider 204 in the deployed position. In one embodiment, as shown in FIG. 4A, the attachment mechanism 232 can include a keyhole slot 234 in which the appropriately configured end 235 of the longitudinal divider 204 can be received. In other variations, as shown in FIG. 4B, an end 237 of the longitudinal divider 204 may simply comprise a hook that can be received over the frame of the front wall 226 of the basket 202. When the longitudinal divider 204 is deployed, the first plurality of hooks 206 for receiving the grocery bags can be slid along the longitudinal divider 204 and distributed there along.

In one embodiment, the longitudinal divider 204 can be configured with notches, indentations, or other means to denote where each of the first plurality of hooks 206 should be approximately placed. For instance, the longitudinal divider 204 could include colored markers to indicate where the hooks should be placed. The second plurality of hooks 208 can be provided along the left and right edges of the basket 202. The second plurality of hooks 208 can be of any suitable configuration including those described previously.

Referring to FIG. 4A, one example embodiment of the attachment mechanism 232 is illustrated. As previously mentioned, the attachment mechanism 232 may include the keyhole slot 234 and the end 235 of the longitudinal cable 204 can be adapted to insert into and be coupled to the keyhole slot 234. As shown, the end 235 of the cable 204 can insert into a top of the keyhole slot 234 and slide down the slot 234 to be locked in place.

Of note, other configurations of the attachment mechanism 232 are contemplated. For example, the attachment mechanism 232 may comprise the hook 237 configured to couple to the frame of the front wall 226 and be easily moved up and down the front wall 226 to a height a user chooses. In another example, the attachment mechanism 232 may be a clasp configured to couple to the front wall 226 of the basket 202.

A Second Embodiment of a Multiple Bag Hanging Cart

Figure 5:
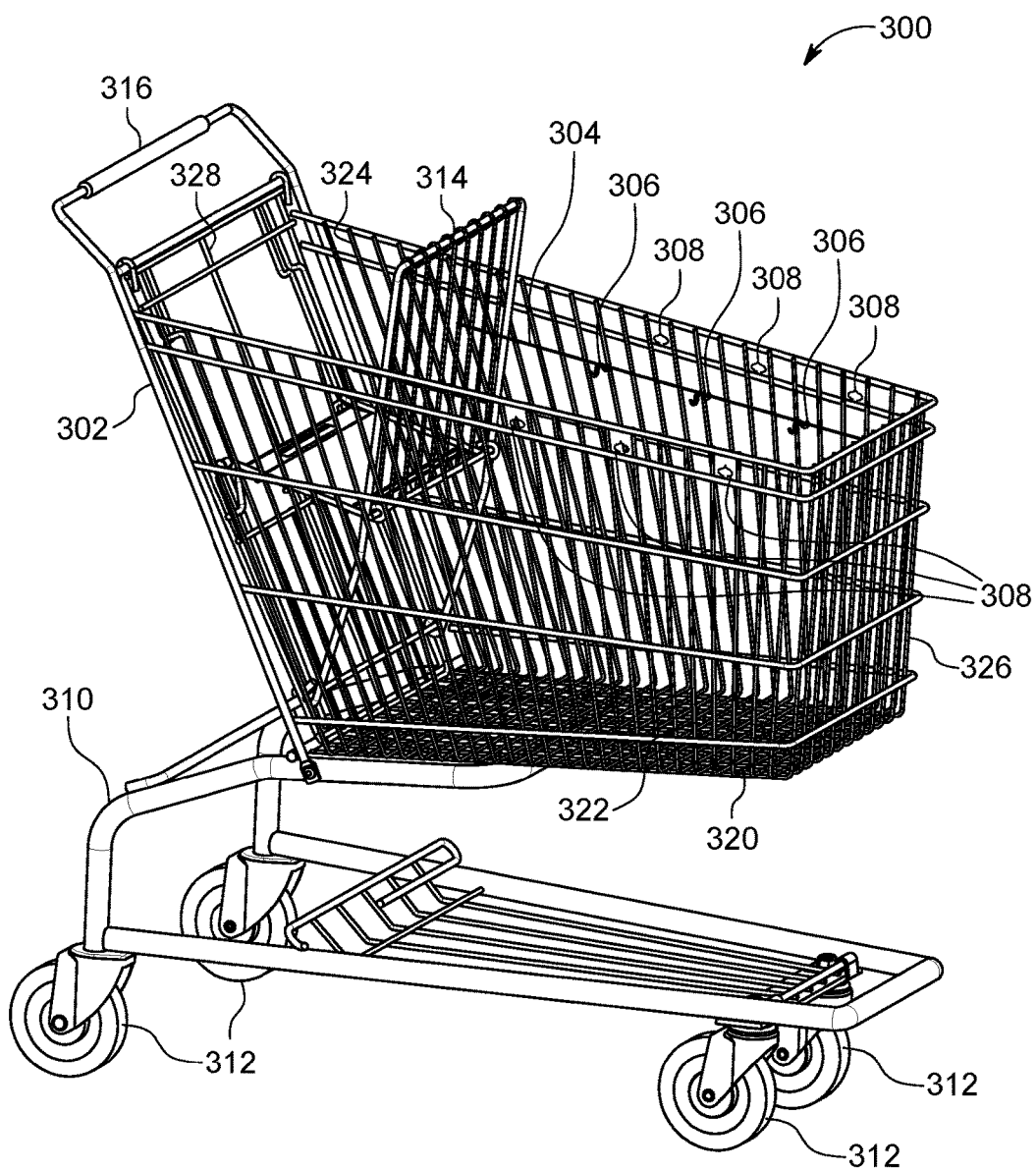
FIG. 5 is a perspective view of a multiple bag hanging cart according to one embodiment of the present invention.

Referring to FIG. 5, a detailed diagram of a second embodiment 300 of a multiple bag hanging cart is illustrated. As shown, the second embodiment shopping cart 300 can include components substantially similar to the first embodiment shopping cart 100 and can be implemented in a similar manner.

The second embodiment shopping cart 300 can include, but is not limited to, a basket 302, a longitudinal divider 304, a first plurality of hooks 306, and a second plurality of hooks 308. The cart 300 may further include a lower frame 310 having a plurality of casters 312, a child seat 314, and a handle 316.

The basket 302 can be defined by a bottom 320, a right sidewall 322, a left sidewall 324, a front wall 326, and a back wall 328. Depending on an implementation, the basket 302 can be made from metal or rigid plastic. Similar to currently available carts, the back wall 328 can have a hinged connection such that the back wall 328 can rotate upwards towards an interior of the basket 302 to nest with another cart. For instance, the basket 302 can receive another basket inside the basket 302 via the back wall 328. The child seat 314 can typically be integrated into the back wall 328.

The longitudinal divider 304 can be coupled between the child seat 314 and the front wall 326 of the basket 302. As shown, the longitudinal divider 304 can effectively divide the basket 302 in-half along a longitudinal line of the basket 302. Of note, the longitudinal divider 304 can couple to the child seat 314 and the front wall 326 via one or more known means. In one example, the longitudinal divider 304 may implement hooks. In another example, the longitudinal divider may implement clasps at either end of the divider 304 to removably couple to the basket 302.

Similar to the first embodiment cart 100, the first plurality of hooks 306 can be dispersed along a length of the divider 304. Typically, the hooks 306 can be evenly spaced along a length of the divider 304. In one embodiment, the hooks 306 can each be dual prong hooks with the prongs of the hooks facing either side of the basket 302. Of note, different shaped dual prong hooks are contemplated. In some embodiments, a pair of single prong hooks can be used in conjunction to one another to face the sides of the basket 302.

Although not shown, in one example embodiment, the longitudinal divider 304 may include a first portion and a second portion. The first portion may be located along a front portion of the basket and can include the first plurality of hooks 306. The second portion of the longitudinal divider may be elastic and can be implemented to allow the child seat 314 to open and close while the first portion remains in place. As can be appreciated, the first plurality of hooks 306 can remain in place while the second portion of the longitudinal divider 304 can effectively move back and forth with the child seat 314. Of significant note, in such an embodiment, the longitudinal divider 304 may continuously be coupled between the child seat 314 and the front wall 326 even when the cart 300 is nested by or with another cart.

In yet another example embodiment, the longitudinal divider 304 can be comprised of an elastic material and a sheathing (or covering) that remains in place while the elastic material moves back and forth based on a location of the child seat 314. Typically, the first plurality of hooks 306 can be coupled to the sheathing such that as the elastic longitudinal divider 304 stretches, the first plurality of hooks 306 can remain in place.

The second plurality of hooks 308 can be dispersed along an upper portion of the right sidewall 322 and the left sidewall 324. As shown, the hooks 308 can be integrated into the sidewalls 322, 324 and sit flush within the side walls to allow another cart to be nested within the basket 302.

In a typical implementation, one or more grocery bags can be hung between the longitudinal divider 304 and either of the sidewalls 322, 324 of the basket 302. Items can then be placed in each of the bags as a user shops.

Figure 6:
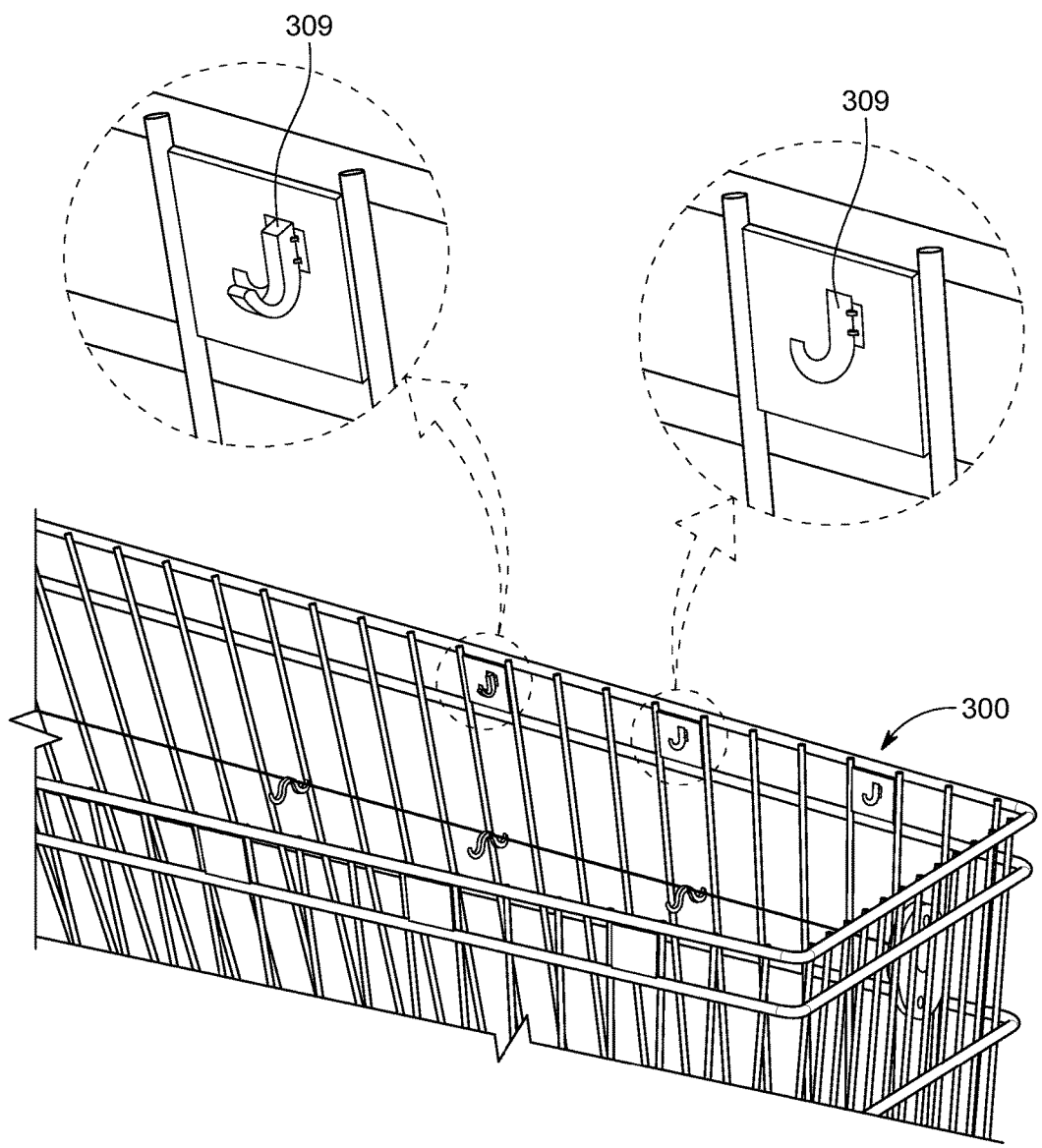
FIG. 6 is a perspective view of a multiple bag hanging cart according to one embodiment of the present invention.

Referring to FIG. 6, an example embodiment of a plurality of hooks 309 located proximate an upper edge of the sidewalls 322, 324 is illustrated. As show, the hooks 309 can have a hinged connection (or coupling) to an insert piece allowing the hooks 309 to rotate to a deployed position for receiving a handle of a bag and a stored position where the hooks 309 rotate into the insert out of the way of another cart nesting with the cart 300. As can be appreciated, when a user is ready to hang bags in the cart 300, the hooks 309 can be rotated out to the deployed position to receive a handle of bag. When the user is done, the hooks 309 may be biased to rotate back to the stored position, effectively removing the hooks 309 to allow another cart to nest with the cart 300. As previously mentioned, the hooks 309 may be biased to rotate in either direction depending on an implementation. Of significant note, hooks similar to those shown in FIG. 6 can be implemented in each embodiment of the present invention. For instance, the kit 200 may include a plurality of inserts having hinged hooks for placement in the sidewalls of a cart. Further, other configurations and coupling means are contemplated for incorporating hinged hooks and/or biased hooks into sidewalls of the previously described carts.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:
1. A shopping cart comprising:
 a basket being defined by a bottom, a pair of sidewalls, a front wall, and a back wall;
 a child seat;
 a frame supporting the basket and including a plurality of wheels;
 wherein the basket includes:

a longitudinal divider extending down an approximate middle of the basket from proximate the child seat to proximate the front wall; and a plurality of dual prong hooks coupled to the longitudinal divider;

wherein the pair of sidewalls each include a plurality of hooks integrated into an upper portion of the sidewalls.

2. The shopping cart of claim 1, wherein the longitudinal divider is retractable.

3. The shopping cart of claim 1, wherein the plurality of hooks are each rotatable from a stored position to a deployed position.

4. The shopping cart of claim 3, wherein the plurality of hooks each reside substantially within the pair of sidewalls to allow a second shopping cart to nest with the shopping cart in the stored position.

5. The shopping cart of claim 4, wherein the plurality of dual prong hooks on the longitudinal divider are aligned with the plurality of hooks on the sidewalls of the basket.

6. The shopping cart of claim 1, wherein (i) the longitudinal divider is a rigid rod, (ii) the plurality of dual prong hooks are each spaced out along a length of the longitudinal divider, and (iii) the plurality of dual prong hooks align with respective hooks located on the sidewalls of the basket.

7. The shopping cart of claim 1, further comprising:
a retractor mechanism configured to retract the longitudinal divider;
wherein the plurality of dual prong hooks are slidably connected to the longitudinal divider.

8. The shopping cart of claim 7, wherein (i) the longitudinal divider includes an attachment mechanism to attach the longitudinal divider to the front wall of the basket, and (ii) the retractor mechanism is located proximate the child seat.

9. The shopping cart of claim 7, wherein (i) the longitudinal divider includes an attachment mechanism to attach the longitudinal divider to the child seat, and (ii) the retractor mechanism is located proximate the front wall of the basket.

10. The A shopping cart kit comprising:
a longitudinal divider comprising a cable, the longitudinal divider adapted to be coupled between a child seat and a front wall of a basket of a shopping cart along a longitude of the basket;
a plurality of dual prong hooks coupled to the longitudinal divider; and
a plurality of single prong hooks adapted to be coupled to sidewalls of the basket of the shopping cart;
a retractor mechanism operatively connected to a first end of the longitudinal divider;
wherein the retractor mechanism is adapted to be coupled to the front wall or the child seat of the basket (ii) each of the plurality of dual prong hooks is configured to be aligned with a pair of the plurality of single prong hooks located on either side of the basket.

11. The shopping cart kit of claim 10, wherein (i) the longitudinal divider includes an attachment mechanism adapted to couple the longitudinal divider to the basket, and (ii) the attachment mechanism is located on a second end of the longitudinal divider.

12. The shopping cart kit of claim 11, wherein the attachment mechanism is a hook.

13. The shopping cart kit of claim 11, wherein the attachment mechanism includes (i) a keyhole slot attached to the front wall of the basket, and (ii) a protrusion adapted to interface with the keyhole slot located on the second end of the longitudinal divider.

14. A combination comprising:
the shopping cart kit of claim 10; and
a shopping cart.

15. A shopping cart comprising:
a basket being defined by a bottom, a pair of sidewalls, a front wall, and a back wall;
a frame supporting the basket and including a plurality of wheels;
a retractable cable extending down an approximate middle of the basket from proximate the back wall to proximate the front wall;
a retractor mechanism operatively coupled to a first end of the retractable cable and coupled to the back wall of the basket;
a plurality of dual prong hooks coupled to the retractable cable; and
a plurality of hooks located proximate a top of each of the pair of sidewalls.

16. The shopping cart of claim 15, wherein the retractable cable includes an attachment mechanism adapted to removably couple a second end of the retractable cable to the front wall of the basket.

17. The shopping cart of claim 16, wherein the attachment mechanism is a hook.

18. The shopping cart of claim 15, wherein the plurality of dual prong hooks are slidably coupled to the retractable cable.

19. The shopping cart of claim 15, wherein the plurality of hooks located proximate the top of each of the pair of sidewalls are integrally part of the basket.

* * * * *